(12) United States Patent
Kim et al.

(10) Patent No.: US 9,798,185 B2
(45) Date of Patent: *Oct. 24, 2017

(54) ACRYLIC ADHESIVE COMPOSITION

(71) Applicant: LG CHEM, LTD., Seoul (KR)

(72) Inventors: Se Ra Kim, Daejeon (KR); Kee Young Kim, Incheon (KR); Sung Soo Yoon, Daejeon (KR); Min Ki Lee, Daejeon (KR); No Ma Kim, Daejeon (KR); In Cheon Han, Seoul (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/074,274

(22) Filed: Nov. 7, 2013

(65) Prior Publication Data

US 2014/0093662 A1    Apr. 3, 2014

Related U.S. Application Data

(63) Continuation of application No. 12/812,736, filed as application No. PCT/KR2009/000152 on Jan. 12, 2009, now Pat. No. 9,482,896.

(30) Foreign Application Priority Data

Jan. 14, 2008   (KR) .................. 10-2008-0004044

(51) Int. Cl.
| | | |
|---|---|---|
| *G02F 1/1335* | (2006.01) | |
| *C08L 33/08* | (2006.01) | |
| *C08L 33/10* | (2006.01) | |
| G02B 5/30 | (2006.01) | |
| C09J 133/12 | (2006.01) | |
| C09J 7/02 | (2006.01) | |
| C09J 133/08 | (2006.01) | |
| C09J 133/10 | (2006.01) | |

(52) U.S. Cl.
CPC ........ *G02F 1/133528* (2013.01); *C08L 33/08* (2013.01); *C08L 33/10* (2013.01); *B32B 2457/202* (2013.01); *C08L 2205/02* (2013.01); *C08L 2312/00* (2013.01); *C09J 7/0217* (2013.01); *C09J 7/0246* (2013.01); *C09J 133/08* (2013.01); *C09J 133/10* (2013.01); *C09J 133/12* (2013.01); *G02B 5/305* (2013.01); *Y10T 428/105* (2015.01); *Y10T 428/1041* (2015.01); *Y10T 428/1073* (2015.01); *Y10T 428/1077* (2015.01)

(58) Field of Classification Search
CPC .... G02F 1/133528; C08L 33/08; C08L 33/10; C08L 2205/02; C08L 2312/00; B32B 2457/202; Y10T 428/1073; Y10T 428/1077; Y10T 428/1041; Y10T 428/105; C09J 7/0246; C09J 7/0217; C09J 133/08; C09J 133/10; C09J 133/12; G02B 5/305
USPC .................. 428/1.1, 212; 349/122; 525/100; 524/560
See application file for complete search history.

(56) References Cited

U.S. PATENT DOCUMENTS

| | | | |
|---|---|---|---|
| 6,663,978 | B1 | 12/2003 | Olson et al. |
| 9,469,663 | B2 * | 10/2016 | Park ........................ C07F 9/582 |
| 2007/0055006 | A1 * | 3/2007 | Kim et al. .................... 524/556 |
| 2010/0068420 | A1 | 3/2010 | Kim et al. |
| 2011/0043737 | A1 * | 2/2011 | Kim et al. .................... 349/122 |

FOREIGN PATENT DOCUMENTS

| | | | |
|---|---|---|---|
| JP | 61-207101 A | 9/1986 | |
| JP | 10-279907 | 10/1998 | |
| JP | 2001107005 A * | 4/2001 | ............... C08J 3/24 |
| JP | 2002-173656 | 6/2002 | |
| JP | 2002-173656 A | 6/2002 | |
| JP | 2002-332468 A | 11/2002 | |
| JP | 2003-013029 | 1/2003 | |
| JP | 2003-013029 A | 1/2003 | |
| JP | 2005-053976 A | 3/2005 | |
| JP | 2005053976 A * | 3/2005 | ............ C09J 133/00 |
| JP | 2006-009250 | 1/2006 | |
| JP | 2006-133606 | 2/2006 | |
| JP | 2006-058718 A | 3/2006 | |
| JP | 2007-169329 | 7/2007 | |
| JP | 2009-544765 | 12/2009 | |
| JP | 2010-516855 | 5/2010 | |
| KR | 10-2003-0069461 A | 8/2003 | |
| KR | 10-2006-0060264 A | 6/2006 | |
| KR | 10-2007-0063365 | 6/2007 | |
| KR | WO 2008091050 A1 * | 7/2008 | ............ C09J 133/06 |
| TW | 200728424 | 8/2007 | |
| WO | 2007-058277 | 5/2007 | |

* cited by examiner

Primary Examiner — Eli D Strah
(74) Attorney, Agent, or Firm — Dentons US LLP

(57) ABSTRACT

The invention relates to an acrylic adhesive composition, more particularly, to an adhesive composition which: specifies the contents of a (meth)acrylic ester-based monomer and an aromatic group-containing monomer of an acrylic copolymer as a composition having little or no difference of birefringence; has excellent durability; and can reduce light leakage due to flexure by mixing a crosslinkable functional group-containing acrylic copolymer (A) and an acrylic copolymer (B) which does not contain the crosslinkable functional group, in a ratio of 1:9 to 5:5.

14 Claims, No Drawings

ACRYLIC ADHESIVE COMPOSITION

This application is a continuation of Ser. No.12/812,736, filed on Jul. 13, 2010, which is a 35 U.S.C. §371 National Stage entry of International Application No. PCT/KR2009/000152 filed Jan. 12, 2009, which claims priority to Korean Application No. 10-2008-0004044 filed Jan. 14, 2008, all of which are hereby incorporated by reference for all purposes as if fully set forth herein in their entireties.

TECHNICAL FIELD

The present invention generally relates to an acrylic pressure-sensitive adhesive composition, and more particularly, to an acrylic pressure-sensitive adhesive composition which specifies the contents of a (meth)acrylic acid ester monomer and an aromatic group containing monomer of an acrylic copolymer, to a composition having no birefringence difference, and mixes an acrylic copolymer having a crosslinking functional group (A) and an acrylic copolymer having no crosslinking functional group (B) at a mixture ratio of 1:9 to 5:5, thereby providing excellent durability and reducing light leakage caused by bending.

BACKGROUND ART

Generally, in preparing liquid crystal display (LCD) devices, liquid crystal cells including liquid crystals and polarizers are basically required and suitable adhesive layers or pressure-sensitive adhesive layers have to be used for binding them. In addition, for improving functions of LCD devices, a phase retardation plate, a compensation plate for wide view angle, a brightness enhancing film, and the like may be used, with additionally adhered to the polarizer.

The main structure forming an LCD device includes, generally, a uniformly aligned liquid crystal layer; a polarizer with a multi-layer structure, incorporated into a pressure-sensitive adhesive layer or an adhesive layer, based on a liquid crystal cell consisting of a transparent glass plate or a plastic sheet material containing a transparent electrode layer; a phase retardation plate; and an additional functional film layer and the like.

The polarizer has a structure including an iodine compound or a dichroic polarizing material aligned in a certain direction. To protect these polarizing elements, multi-layers are formed on both sides using a protective film such as triacetyl cellulose (TAC). In addition, the polarizer may additionally include a phase retardation film, a compensation film for wide view angle such as a liquid crystal type film, a brightness enhancing film, a reflective layer, or a smoke layer in a shape having a unidirectional molecular alignment.

The aforementioned films are made of materials having different molecular structures and compositions, and so have different physical properties. In particular, under high temperature or high temperature and humidity conditions, the dimensional stability according to shrinkage or expansion of materials having a unidirectional molecular alignment is insufficient.

As a result, if the polarizer is fixed by a pressure-sensitive adhesive, then stress remains by shrinkage or expansion of the polarizer under high temperature, or high temperature and humidity conditions. As a result, the pressure-sensitive adhesive layer is deformed and high polymers in the crosslinking structure are aligned in a specific direction due to the residual stress, whereby birefringence is developed. Under this alignment, a general alkyl acrylic pressure-sensitive adhesive shows a negative birefringence, and thus light leakage occurs due to the birefringence difference.

As a method of minimizing light leakage under the residual stresses, a birefringence caused by the pressure-sensitive adhesive under the residual stress may be minimized by adding (blending) materials having a positive birefringence under the residual stress to the final pressure-sensitive adhesive layer or copolymerizing acrylic monomers having a positive birefringence.

Korean Laid-Open Patent Publication No. 2003-0069461 discloses a technical idea of correcting a negative birefringence of an acrylic pressure-sensitive adhesive layer under the residual stress by incorporating a low-molecular weight material having a positive birefringence under the stress into 0.01–40 part by weight of the acrylic pressure-sensitive adhesive layer. However, in this case, the modulus of the pressure-sensitive adhesive is lowered due to the low-molecular weight materials incorporated into the pressure-sensitive adhesive layer. As a result, there is a problem in tailoring property in processing the polarizer and there are problems such as the moving of the low-molecular weight material into the interface for long-term storage and the possibility of phase separation with the acrylic pressure-sensitive adhesive.

A method of minimizing birefringence by copolymerizing a monomer having a negative birefringence and a monomer having a positive birefringence under the residual stress is disclosed in "Applied Optics" (1997). As a specific example, the degree of birefringence may be regulated under the given stress by copolymerizing an acrylic monomer (negative birefringence) having a side chain of an alkyl group and an acrylic monomer (positive birefringence) having a side chain of an aromatic group. Japanese Patent Laid-Open Publication No. 2002-332468 discloses a method of improving plastic resistance of the pressure-sensitive adhesive layer by introducing an acrylic monomer containing an aromatic group in a side chain. In addition, U.S. Pat. No. 6,663,978, and Japanese Patent Laid-Open Publication Nos. 2002-173656 and 2003-013029 disclose a method of regulating a refractive index of a pressure-sensitive adhesive layer by introducing an acrylic monomer containing an aromatic group in a side chain. Further, Japanese Patent Laid-Open Publication No. 2005-053976 discloses a method of improving pressure-sensitive adhesion performance in even low polar films by introducing an acrylic monomer containing an aromatic group in a side chain. However, in those patents, there are not notified technical ideas of attempting optical compensation which regulates birefringence under the residual stress to improve the light leakage phenomenon, when acrylic pressure-sensitive adhesives for polarizing plates are prepared by introducing an acrylic monomer containing an aromatic group in a side chain.

Japanese Patent Laid-open Publication No. 1986-207101 discloses a method to prepare a pressure-sensitive adhesive by mixing an acrylic copolymer (A) having a crosslinking functional group, an acrylic copolymer (B) not having a crosslinking functional group, and a multi-functional crosslinking agent having at least two functional groups, wherein the weight ratio of A/B is in the range of 1/4~4/1. Although this Publication discloses a technical feature that the shelf life of the pressure-sensitive adhesive can be extended by removing a free functional group through addition of a corresponding amount of multi-functional crosslinking agent to the amount of the crosslinking functional group during the crosslinking process, it does not disclose any condition on the molecular weight of an acrylic polymer used therein, nor a technical feature of the crosslinking structure. Particularly, the patent does not disclose a technical feature of the stress release property of a pressure-sensitive adhesive.

In a liquid crystal display method of a twisted nematic (TN) type or a super twisted nematic (STN) type, polarizers are generally attached onto both sides of a liquid crystal panel with their optical axes being crossed at 45° and 135°, for which light leakage caused by the residual stress is crucial.

However, in a liquid crystal display (LCD) device such as In-Plane Switching (IPS) type or Vertical Alignment (VA) type mainly used in large scale TVs, polarizers are attached onto both sides of a liquid crystal panel with their optical axes being crossed at 0° and 90°. For these LCD devices, light leakage caused by bending of a liquid crystal panel as well as light leakage caused by stress concentration in a heat or moist heat environment is known to be a crucial factor. The bending of the liquid crystal panel is caused by a difference in shrinkage of the polarizer (especially, the elongation axis direction) according to position under a heat or moist heat condition. That is, TN type or STN type LCD devices are structured such that the polarizers are attached with their optical axes being crossed at 45° and 135° and thus the elongation axis direction of the upper polarizer and the elongation axis direction of the lower polarizer are positioned symmetrically or in a balanced way, whereas LCD devices such as IPS type or VA type are structured such that the polarizers are attached with their optical axes being crossed at 0° and 90° and thus the elongation axis direction of the upper polarizer and the elongation axis direction of the lower polarizer are positioned asymmetrically. As a result, in the LCD devices such as IPS type or VA type, bending of the upper polarizer and bending of the lower polarizer are different from each other, for which the liquid crystal panel is bent in a direction that the degree of bending is large. Due to such bending of the liquid crystal panel, the liquid crystal panel is pressed by a top case used to fix the liquid crystal panel, resulting in light leakage caused by non-uniformity of liquid crystals.

Korean Patent Laid-Open Publication No.10-2006-0060264 discloses an LCD device having a feature that an upper polarizer and a lower polarizer have pressure-sensitive adhesive layers, respectively, and the pressure-sensitive adhesive layer of the upper polarizer and the pressure-sensitive adhesive layer of the lower polarizer have different pressure-sensitive adhesive strengths according to the direction of bending of a liquid crystal panel, thereby improving the bending phenomenon. However, with this method, it is difficult to control the degree of bending of the upper polarizer and the lower polarizer according to an environment (heat or moist heat condition).

Japanese Patent Laid-Open Publication No. 2006-58718 discloses a pressure-sensitive adhesive for a polarizer having a storage modulus of $10^5 \sim 10^9$ Pa and a glass transition temperature of −20° C. or higher at 0~50° C. after crosslinking to suppress light leakage of an LCD device of an IPS or MVA type, thereby achieving higher modulus and glass transition temperature than those of conventional pressure-sensitive adhesives. However, this patent does not mention improvement associated with bending of a liquid crystal panel of an IPS or MVA type and with the method suggested in this patent, it is difficult to solve the light leakage problem caused by bending of the liquid crystal panel.

Therefore, there is an urgent need for development of a new pressure-sensitive adhesive for a polarizer, which can solve the light leakage problem caused by bending of a liquid crystal panel as well as light leakage caused by residual stress, without changing main features of a polarizer product such as durability under a long-term use condition as well as a heat or moist heat condition, and a polarizer adopting the new pressure-sensitive adhesive.

TECHNICAL PROBLEM

To solve the foregoing problems of the prior art, an object of the present invention is to provide a pressure-sensitive adhesive composition capable of solving a light leakage phenomenon caused by bending of a liquid crystal panel as well as light leakage caused by residual stress under a heat or moist heat condition by controlling birefringence of an acrylic pressure-sensitive adhesive for a polarizer.

Another object of the present invention is to provide a polarizer including a pressure-sensitive adhesive layer containing the pressure-sensitive adhesive composition having superior property.

Further another object of the present invention is to provide a liquid crystal display (LCD) device including the polarizer.

TECHNICAL SOLUTION

In order to achieve the foregoing objects, the present invention provides a pressure-sensitive adhesive composition which comprises a crosslinkable acrylic copolymer (A) containing a monomer having a crosslinking functional group and a non-crosslinkable acrylic copolymer (B) at a mixture ratio of 1:9 to 5:5, wherein each of the acrylic copolymers (A) and (B) comprises 75 to 97 parts by weight of a (meth)acrylic acid ester monomer and 3 to 25 parts by weight of an aromatic group containing monomer.

The present invention also provides a polarizer including a polarization film and a pressure-sensitive adhesive layer formed on one side or both sides of the polarization film and containing the pressure-sensitive adhesive composition according to the present invention.

The present invention also provides a liquid crystal display (LCD) device including a liquid crystal panel in which the polarizer is attached onto one side or both sides of a liquid crystal cell.

ADVANTAGEOUS EFFECTS

In an acrylic pressure-sensitive adhesive composition according to the present invention, a crosslinking high polymer of an acrylic copolymer forms a dense crosslinking structure and non-crosslinking high polymers link the crosslinking structure such that durability and flowability are satisfied and thus there is no birefringence difference due to the residual stress, thereby solving the light leakage phenomenon caused by bending of a liquid crystal panel as well as light leakage caused by the residual stress under a heat or moist heat condition.

BEST MODE

Hereinafter, the present invention will be described in detail.

To solve the disadvantage of the prior art that light leakage still occurs due to birefringence difference caused by residual stress even when a plasticizer or a low molecular weight material is added to a copolymer or a pressure-sensitive adhesive has a stress-releasing function by regulating a crosslinking structure in order to improve the light leakage phenomenon caused by bending, the present inventors specified the contents of a (meth)acrylic acid ester monomer and an aromatic group containing monomer of an acrylic copolymer, to a composition having no birefringence difference, and used a mixture ratio of 1:9 to 5:5 for a high molecular weight copolymer having a crosslinking functional group (A) and a high molecular weight copolymer having no crosslinking functional group (B). Thus, the present inventors found out that this composition can reduce the light leakage phenomenon caused by bending without sacrificing durability and completed the present invention.

Therefore, the present invention provides a pressure-sensitive adhesive composition including a crosslinkable acrylic copolymer (A) containing a monomer having a crosslinking functional group and a non-crosslinkable acrylic copolymer (B) at a mixture ratio of 1:9 to 5:5, in which the copolymers (A) and (B) comprise 75 to 97 parts by weight of a (meth)acrylic acid ester monomer and 3 to 25 parts by weight of an aromatic group containing monomer, respectively.

In the pressure-sensitive adhesive composition according to the present invention, in preparation of an acrylic copolymer, when each of the copolymers (A) and (B), which is high molecular weight material, includes 75 to 97 parts by weight of an alkyl(meth)acrylic acid ester monomer and 3 to 25 parts by weight of an acrylic ester monomer having a copolymerizable aromatic group, there is no birefringence difference resulting from residual stress.

In addition, when a mixture ratio of a high molecular weight acrylic copolymer (A) having a crosslinking functional group and a high molecular weight acrylic copolymer (B) having no crosslinking functional group is 1:9 to 5:5 in the aforementioned composition, superior durability can be obtained and light leakage caused by bending can be reduced. That is, a reason that the pressure-sensitive adhesive has such superior durability in spite of low crosslinking density, is that when non-crosslinkable high polymers are more than crosslinkable high polymers, the crosslinkable high polymers form a relatively dense crosslinking structure in spite of low crosslinking density and the non-crosslinkable high polymers of the pressure-sensitive adhesive link the crosslinking structure, thereby satisfying durability and flowability at the same time.

In the pressure-sensitive adhesive composition according to the present invention, each component is specified below.

a) Acrylic Copolymers

Acrylic copolymers are not specifically limited if they can be used as a general adhesive in the art, but are preferably:

a crosslinkable acrylic copolymer (A) including a monomer having a crosslinking functional group and a non-crosslinkable acrylic copolymer (B) at a mixture ratio of 1:9 to 5:5, in which each of the copolymers (A) and (B) includes 75 to 97 parts by weight of a (meth)acrylic ester monomer and 3 to 25 parts by weight of an aromatic group containing monomer.

Each of the acrylic copolymers (A) and (B) may use, as a (meth)acrylic acid ester monomer, alkyl ester having acrylic acid (or methacrylic acid) of 1 to 12 carbon atoms. If the carbon atoms of alkyl exceed the above range, particularly, if an alkyl group is in the form of a long chain, the cohesive strength of a pressure-sensitive adhesive is degraded. For this reason, in order to maintain the cohesive strength at high temperature, it is desirable to use alkyl ester having acrylic acid (or methacrylic acid) of 2 to 8 carbon atoms.

As the (meth)acrylic acid ester monomer, it is preferable to use one or more selected from a group consisting of methyl(meth)acrylate, ethyl(meth)acrylate, n-propyl(meth)acrylate, isopropyl(meth)acrylate, t-butyl(meth)acrylate, n-butyl(meth)acrylate, sec-butyl(meth)acrylate, pentyl(meth)acrylate, 2-ethylhexyl(meth)acrylate, n-octyl(meth)acrylate, isooctyl(meth)acrylate, or isononyl(meth)acrylate.

It is preferable that the content of the (meth)acrylic acid ester monomer having an alkyl of 1 to 12 carbon atoms is 75 to 97 parts by weight based on 100 parts by weight of the acrylic copolymer (A) or (B). If the content of the (meth)acrylic acid ester monomer is less than 75 parts by weight, initial adhesive strength is degraded. If the content is more than 97 parts by weight, a problem may occur in durability due to degradation in cohesive strength.

In order to correct a negative birefringence of the acrylic copolymer under residual stress, each of the acrylic copolymers (A) and (B) preferably includes an aromatic-group containing monomer having a positive birefringence under stress.

The aromatic-group containing monomer is preferably a compound of Formula 1:

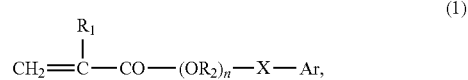

(1)

where $R_1$ indicates hydrogen or a methyl group, $R_2$ indicates an alkylene group of 1 to 12 carbon atoms, n indicates an integer of 0 to 3, X indicates a single bond, oxygen, sulfur, or an alkylene group of 1 to 4 carbon atoms, and Ar indicates an aromatic group unsubstituted or substituted with halogen or alkyl of 1 to 12 carbon atoms.

The aromatic group containing monomer may be one or more selected from a group of phenoxy ethyl(meth)acrylate, benzyl(meth)acrylate, 2-phenylthio-1-ethyl acrylate, 8-(2-naphtyloxy)-1-octyl acrylate, and 2-(1-naphtyloxy)-1-ethyl acrylate, and more preferably may be benzyl acrylate or phenoxy ethyl acrylate.

The content of the aromatic-group containing monomer is preferably 3 to 25 parts by weight based on 100 parts by weight of the acrylic copolymer (A) or (B). If the content of the aromatic-group containing monomer is less than 3 parts by weight, a final pressure-sensitive adhesive shows a negative birefringence and thus the optical light leakage improving effect is slight. If the content is in excess of 25 parts by weight, a positive birefringence under residual stress is large and thus the light leakage improving effect is slight and pressure-sensitive adhesion property is degraded, resulting in low endurance reliability.

The acrylic copolymer (A) includes a crosslinking functional group containing monomer which provides cohesive strength or adhesive strength due to chemical bond in order to prevent destruction of cohesive strength of the adhesive under a high temperature or humidity condition by reacting with a multifunctional crosslinking agent.

The crosslinking functional group containing monomer is preferably a hydroxy group containing monomer, a carboxyl group containing monomer, or anhydride thereof. The crosslinking functional group containing monomer may include 2-hydroxyethyl(meth)acrylate, 3-hydroxypropyl(meth)acrylate, 4-hydroxybutyl(meth)acrylate, 2-hydroxyethyleneglycol(meth)acrylate, 3-hydroxypropyleneglycol(meth)acrylate, acrylic acid, methacrylic acid, an acrylic acid dimer, itaconic acid, maleic acid, or maleic acid anhydride, but not limited to the aforementioned.

The content of the crosslinking functional group containing monomer is preferably 0.1 to 10 parts by weight based on 100 parts by weight of the acrylic copolymer (A). When the content is less than 0.1 parts by weight, the destruction of cohesion is likely to occur under a high temperature or high humidity condition. If the content is in excess of 10 parts by weight, compatibility is degraded, causing severe migration to the surface, reducing flowability, and deteriorating stress-releasing property due to increase in cohesive strength.

Preferably, in the pressure-sensitive adhesive composition according to the present invention, the acrylic copolymer may include a functional monomer having a high glass transition temperature as an arbitrary component to regulate the glass transition temperature of the pressure-sensitive adhesive in preparation of an acrylic copolymer or to add other functions.

The functional monomer may be a monomer having a general copolymerizable vinyl group which is preferably a compound represented by the following Formula 2:

where $R_3$ indicates hydrogen or alkyl, and $R_4$ indicates cyano, phenyl unsubstituted or substituted with alkyl, acetyloxy, or $COR_5$, where $R_5$ indicates amino or glycidyloxy unsubstituted or substituted with alkyl or alkoxy of 1 to 4 carbon atoms. The functional monomer may be one or more selected from a group consisting of acrylonitrile, (meth)acryl amide, N-methyl(meth)acryl amide, styrene, methyl styrene, glycidyl(meth)acrylate, and vinyl acetate.

If the content of the vinyl group containing monomer in the acrylic copolymer is too high, the flexibility and peel strength of the pressure-sensitive adhesive composition are lowered. In this regard, it is preferable to use less than 20 parts based on 100 parts by weight of total monomer components.

In the pressure-sensitive adhesive composition according to the present invention, the acrylic copolymers (A) and (B) may be prepared by a conventional method such as solution polymerization, photo-polymerization, bulk polymerization, suspension polymerization, or emulsion polymerization, and preferably may be prepared by solution polymerization. The polymerization temperature is preferably 50 to 140° C. and the initiator is preferably added in a state where monomers are evenly mixed.

The polymerization initiator may use an azo-based polymerization initiator such as azo-bisisobutyronitrile and azobiscyclohexanecarbonitrile, or peroxide such as benzoyl peroxide and acetyl peroxide alone or in a mixture thereof.

To obtain a low molecular weight material, mercaptan like lauryl mercaptan, n-dodecylmercaptan, and n-octylmercaptan and a chain transfer agent such as a alpha methyl styrene dimer may be used together with the polymerization initiator.

Each of the acrylic copolymers (A) and (B) according to the present invention has preferably a weight average molecular weight of more than 1,000,000, and more preferably 1,000,000 to 2,000,000. If the weight average molecular weight is less than 1,000,000, the cohesive strength is insufficient and thus there may be problems in durability under high temperature and high humidity conditions. If the weight average molecular weight is more than 2,000,000, it is not possible to release cohesion concentration.

In the pressure-sensitive adhesive composition according to the present invention, the mixture ratio of the acrylic copolymer (A) and the acrylic copolymer (B) is preferably 1:9 to 5:5 in order to improve light leakage caused by bending and at the same time, to provide superior durability and cutting characteristic. This is because when non-crosslinking high polymers are more than crosslinking high polymers, the crosslinking high polymers form a relatively dense crosslinking structure in spite of low crosslinking density, and the non-crosslinking high polymers of the pressure-sensitive adhesive link the crosslinking structure, thereby satisfying durability and flowability at the same time. When the mixture ratio of the acrylic copolymer (A) and the acrylic copolymer (B) is less than 1:9, i.e., if the content of crosslinking high polymers is small, cohesive strength is lowered, degrading durability and cutting property. If the mixture ratio of the acrylic copolymer (A) and the acrylic copolymer (B) is more than 5:5, i.e., if the content of crosslinking high polymers is large, the flowability of the non-crosslinking high polymers is reduced, making it difficult to improve light leakage caused by bending.

b) Crosslinking Agent

The pressure-sensitive adhesive composition according to the present invention having the above components, if necessary, may additionally comprise a multifunctional crosslinking agent. The multifunctional crosslinking agent plays a role to improve the cohesive strength of the adhesive by reacting with a functional group of an acrylic copolymer.

The multifunctional crosslinking agent may be one or more selected from a group consisting of an isocyanate compound, an epoxy compound, an aziridine compound, and a metal chelate compound.

The isocyanate compound may comprise toluene diisocyanate, xylenediisocyanate, diphenylmethanediisocyanate, hexamethylene diisocyanate, isoform diisocyanate, tetramethylxylene diisocyanate, naphthalene diisocyanate, tripenylmethan triisocyanate, methylenebis(4-penylmethan)triisocyanate, or their reactants with polyol like trimethylolpropane.

The epoxy compound may comprise ethyleneglycol diglycidylether, triglycidylether, trimethylolpropane triglycidylether, N,N,N',N'-tetraglycidylethylenediamine, or glycerine diglycidylether.

The aziridine compound may comprise N,N'-toluene-2,4-bis(1-aziridinecarboxide), N,N'-diphenylmethane-4,4'-bis(1-aziridinecarbodixe), triethylenemelamine, or tri-1-aziridinylphosphineoxide.

As the metal chelate compound, compounds prepared by coordinating multivalent metal such as Al, Fe, Zn, Sn, Ti, Sb, Mg, or V with acethylacetone or ethyl acetoacetate may be used.

In a mixing process for forming a pressure-sensitive adhesive layer, a crosslinking reaction of functional groups of the multifunctional crosslinking agent described above should not occur for even coating process. After the coating process followed by drying process and aging process, a crosslinking structure is formed, thereby obtaining a pressure-sensitive adhesive layer having an elasticity and good cohesive strength. Here, by the good cohesive strength of the pressure-sensitive adhesive, the pressure-sensitive adhesive properties such as the durability of an adhesive product and the cutting characteristic may be enhanced.

The content of multifunctional crosslinking agent is preferably 0.1 to 10 parts by weight based on 100 parts by weight of the acrylic copolymers (A) and (B). When the content is in that range, the cohesive strength of the pressure-sensitive adhesive is superior, a problem in pressure-sensitive adhesion durability such as bubbles or exfoliation does not occur, and lifting does not occur, thereby providing superior endurance reliability.

c) Additive

The pressure-sensitive adhesive composition according to the present invention having the above components, if necessary, may additionally comprise a silane coupling agent or a tackifier resin.

The silane coupling agent has a function of improving adhesion stability and thus more improving heat resistance/moisture resistance property when an acrylic pressure-sensitive adhesive is adhered to a glass substrate. In particular, the silane coupling agent serves to be of help to improve adhesion reliability when it is left for a long time under high temperature and high humidity.

The silane coupling agent may use one or a mixture of at least two selected from a group consisting of γ-glycydoxypropyl trimethoxysilane, γ-glycydoxypropyl methyldiethoxysilane, γ-glycydoxypropyl triethoxysilane, 3-mercaptopropyl trimethoxysilane, vinyl trimethoxysilane, vinyl triethoxysilane, γ-methacryloxypropyl trimethoxysilane, γ-methacryloxypropyl triethoxysilane, γ-aminopropyl trimethoxysilane, γ-aminopropyl triethoxysilane, 3-isocyanatepropyl triethoxysilane, γ-acetoacetatepropyl trimethoxysilane, and the like.

The content of silane coupling agent is preferably 0.005 to 5 parts by weight based on 100 parts by weight of the acrylic copolymers (A) and (B). When the content is in this range, adhesion stability and adhesion reliability are enhanced under high temperature and high humidity.

The tackifier resin has a function of regulating pressure-sensitive adhesion performance of the acrylic pressure-sensitive adhesive.

The tackifier resin may comprise one or a mixture of at least two selected from a group consisting of (hydrogenated) hydrocarbon resin, (hydrogenated) rosin resin, (hydrogenated) rosin ester resin, (hydrogenated) terpene resin, (hydrogenated) terpene penol resin, polymerized rosin resin, polymerized rosin ester resin, and the like.

The content of tackifier resin is preferably 1 to 100 parts by weight based on 100 parts by weight of the acrylic copolymers (A) and (B). When the content is in that range, the compatibility and cohesive strength of the pressure-sensitive adhesive can be enhanced.

The acrylic pressure-sensitive adhesive composition according to the present invention, if necessary, may further comprise an additive such as acrylic low molecular weight substances, epoxy resin, curing agents, ultraviolet (UV) stabilizers, antioxidants, coloring agents, reinforcing agents, fillers, antifoaming agents, surfactants, plasticizers, or the like.

The pressure-sensitive adhesive composition according to the present invention having the above components can be prepared by conventional methods such as thermal curing or photo-curing.

The present invention also provides a polarizer including:
a polarization film; and
a pressure-sensitive adhesive layer formed on one side or both sides of the polarization film and containing the pressure-sensitive adhesive composition according to the present invention.

The polarization film forming the polarizer is not specifically limited. For example, the polarization film may be prepared by adding a polarization component such as iodine or dichroic dyes onto a polyvinyl alcohol resin film and elongating it. Also, there is no limitation in the thickness of the polarization film and so the polarization film may be made in conventional thickness. As polyvinyl alcohol resin, polyvinyl alcohol, polyvinyl formal, polyvinyl acetal and ethylene, a saponified vinyl acetate copolymer, or the like may be used.

On both sides of the polarization film, multilayer films may be formed. The multilayer films are made by laminating protective films such as cellulose films like triacetyl cellulose, etc; polyester films like polycarbonate film, polyethylene terephthalate, etc; poly ether sulphone films; poly olefin films such as polyethylene, polypropylene or polyolefine film having the cyclo or norbornene structure, or an ethylene propylene copolymer. The thickness of such protective films is not limited specifically, and conventional thickness may be accepted.

The method of forming the pressure-sensitive adhesive layer on the polarization film is not specifically limited. For example, the method may include coating the pressure-sensitive adhesive directly on the surface of the polarization film with Bar Coater and then drying it. Alternatively, the method may include coating the pressure-sensitive adhesive on the surface of the dissecting substrate followed by drying, and transferring the pressure-sensitive adhesive layer onto the surface of the polarization film, followed by aging.

On the polarizer according to the present invention, one or more additional layers providing supplementary functions, such as a protective layer, a reflecting layer, an anti-glare film, a phase retardation film, a compensation film for wide view angle, or a brightness enhancing film may be laminated, and the pressure-sensitive adhesive layer according to the present invention may be formed on the additional layers.

The present invention also provides a liquid crystal display (LCD) device including a liquid crystal panel in which the polarizer according to the present invention is attached to one side or both sides of a liquid crystal cell.

The polarizer using the pressure-sensitive adhesive according to the present invention can be applied to all usual LCD devices, the kind of which liquid crystal panel is not specifically limited. Preferably, the present invention may construct LCD devices including a liquid crystal panel in which the pressure-sensitive adhesive polarizing plate is attached to one side or both sides of a liquid crystal cell.

As such, the pressure-sensitive adhesive composition according to the present invention provides superior durability and cutting characteristic and improves the light leakage phenomenon caused by bending of a liquid crystal panel under high temperature and high humidity.

Preferred embodiments of the present invention will be provided in the following examples to help understanding of the present invention, but those embodiments are used only for the purpose of illustration, without limiting the scope of the present invention. It is apparent to those of ordinary skill in the art that various changes and modifications can be made within the scope of the present invention and those changes and modifications are included in the appended claims.

PREPARATION EXAMPLE 1

Preparation of Acrylic Copolymer A-1

To a 1 L reactor equipped with a cooling system for reflux of nitrogen gas and easy regulation of temperature, a monomer mixture composed of 82.5 parts by weight of n-butylacrylate (BA), 5 parts by weight of methylacrylate (MA), 10.5 parts by weight of phenoxy ethyl acrylate(PhEA), and 2.0 parts by weight of 2-hydroxyethylmethacrylate (2-HEMA) was added, and then 100 parts by weight of ethyl acetate (EAc) was added thereto as a solvent. To remove oxygen, nitrogen gas was purged for 1 hour, and the temperature was kept at 62° C. This mixture was equalized and then 0.03 parts by weight of azobisisobutyronitrile (AIBN) diluted with ethylacetate in a concentration of 50% as a reaction initiator was added thereto and reacted for 8 hours, thereby preparing an acrylic copolymer.

PREPARATION EXAMPLE 2

Preparation of Acrylic Copolymers A-2 to B-4

Except that components and compositions as shown in Table 1 were used, an acrylic copolymer was prepared by the same method as described in preparation of the acrylic copolymer A-1. The unit of Table 1 is part by weight.

TABLE 1

| Acrylic Copolymer Preparation | | | | | | | | | | |
|---|---|---|---|---|---|---|---|---|---|---|
| | | A-1 | A-2 | A-3 | A-4 | A-5 | B-1 | B-2 | B-3 | B-4 |
| Acrylic Copolymer Composition | n-BA | 82.5 | 79.7 | 85.7 | 98.0 | 43.0 | 84.5 | 81.7 | 92.1 | 100 |
| | MA | 5.0 | | | | | 5.0 | | | |
| | BzA | | 18.3 | | | 55.0 | | 18.3 | | |
| | PhEA | 10.5 | | 7.9 | | | 10.5 | | 7.9 | |
| | AA | | 0.5 | 6.4 | 0.5 | 0.5 | | | | |
| | 2-HEMA | 2.0 | 1.5 | | 1.5 | 1.5 | | | | |
| | AIBN | 0.03 | 0.03 | 0.03 | 0.03 | 0.03 | 0.03 | 0.03 | 0.03 | 0.03 |
| Weight Average Molecular Weight (10 thousands) | | 150 | 180 | 160 | 180 | 180 | 160 | 140 | 160 | 140 | n-BA: n-butylacrylate
MA: ethylacrylate
BzA: benzyl acrylate
PhEA: phenoxy ethyl acrylate
AA: Acrylic acid
2-HEMA: 2-hydroxyethylmethacrylate

EXAMPLE 1

(Mixing Process)

25 parts by weight of the prepared acrylic copolymer A-1 and 75 parts by weight of the prepared acrylic copolymer B-1 were homogeneously mixed, and then 0.2 parts by weight of tolylene diisocyanate adduct of trimethylolpropane (TDI-I) was added thereto as a crosslinking agent. This mixture was diluted in a proper concentration and then homogeneously mixed. The resulting product was coated on a releasing sheet and dried, thereby preparing a 25 μm homogeneous pressure-sensitive adhesive layer.

(Laminating Process)

The prepared pressure-sensitive adhesive layer was subjected to pressure-sensitive adhesion processing to a polarizer. The obtained polarizer was cut into proper sizes and evaluated. The results evaluated for the polarizer on which the pressure-sensitive adhesive was applied were shown in Table 2 below.

(Physical Property Evaluation)

By the following methods, durability and light leakage were measured with the polarizer prepared above and the results were shown in Table 2.

(Durability Evaluation)

The polarizer (90 mm×170 mm) coated with the pressure-sensitive adhesive prepared in Example 1 was attached to both sides of a glass substrate (110 mm×190 mm×0.7 mm) with each optical absorbing axis crossed. The glass substrate was subjected to a clean room work at the applied pressure of about 5 kg/cm² so that bubbles or edge lifting might not be generated. In order to evaluate moisture-heat resistance of the specimens, they were left at a temperature of 60° C. and a relative humidity of 90% for 1000 hours and then observed about formation of bubbles or releases. The specimens were left at room temperature for 24 hours immediately before evaluation of their states. The evaluation standard for durability was as follows:

○: No bubble or edge lifting was observed.
Δ: A few bubbles or edge lifting occurred.
×: A large amount of bubbles or edge lifting occurred.

(Uniformity of Light Transmission (Light Leakage) Evaluation)

To investigate uniformity of light transmission with the specimen which is equal with the above specimen, it was observed whether light was leaked in a dark room using a backlight. A pressure-sensitive adhesive coated upper polarizer (400 mm×200 mm) having an light absorbing axes of 0° and a pressure-sensitive adhesive coated lower polarizer (400 mm×200 mm) having an light absorbing axes of 90° were attached onto both sides of a glass substrate (410 mm×210 mm×0.7 mm) with each optical axis being crossed. The specimen was left under conditions at a temperature of 60° C. for 500 hours or at a temperature of 40° C. and a relative humidity of 70% for 500 hours, and then it was taken in room temperature. In this state, light leakage (light leakage caused by stress) was observed after the specimen was disposed such that the upper polarizer lied on top, and light leakage (light leakage caused by bending) was observed after the slope of the specimen was pressed (like with the top case of a liquid crystal panel). The uniformity of light transmission was evaluated with the following standard:

○: Non-uniformity phenomenon of light transmission was difficult to determine by the naked eye.
Δ: A few non-uniformity phenomenon of light transmission was present.
×: A large quantity of non-uniformity phenomenon of light transmission was present.

EXAMPLES 2-3 AND COMPARATIVE EXAMPLES 1-4

Except that a pressure-sensitive adhesive based on Table 2 was used, the same preparation method as in Example 1 was used. By using the prepared polarizer, the durability of the pressure-sensitive adhesive, light leakage due to stress, and light leakage due to bending were measured and the results are shown in Table 2.

TABLE 2

Mixing Compositions and Physical Properties of Acrylic Copolymers

|  |  | Examples | | | Comparative Examples | | | | | |
|---|---|---|---|---|---|---|---|---|---|---|
|  |  | 1 | 2 | 3 | 1 | 2 | 3 | 4 | 5 | 6 |
| Copolymer (A) (part by weight) | A-1 | 25 |  |  |  |  | 5 |  |  |  |
|  | A-2 |  | 37 |  |  |  |  | 70 |  |  |
|  | A-3 |  |  | 15 |  | 100 |  |  |  |  |
|  | A-4 |  |  |  |  |  |  |  | 37 |  |
|  | A-5 |  |  |  |  |  |  |  |  | 25 |
| Copolymer (B) (part by weight) | B-1 | 75 |  |  |  |  | 95 |  |  |  |
|  | B-2 |  | 63 |  | 100 |  |  | 30 |  |  |
|  | B-3 |  |  | 85 |  |  |  |  |  |  |
|  | B-4 |  |  |  |  |  |  |  | 63 | 75 |
| Crosslinking Agent (part by weight) |  | 0.2 | 0.2 | 0.2 | 0.2 | 0.2 | 0.2 | 0.2 | 0.2 | 0.2 |
| Endurance Reliability |  | ○ | ○ | ○ | x | ○ | x | ○ | ○ | ○ |
| Light Leakage-1 (Stress) |  | ○ | ○ | ○ | Δ | Δ | ○ | Δ | x | x |
| Light Leakage-1 (Bending) |  | ○ | ○ | ○ | Δ | x | ○ | x | ○ | ○ |

As shown in Table 2, the polarizers of Examples 1 to 3 according to the present invention represent excellent durability and excellent low light leakage property when compared to the one of Comparative Examples 1 to 6.

The invention claimed is:

1. A polarizer, comprising:
a polarization film; and
a pressure-sensitive adhesive layer formed on one side or both sides of the polarization film and comprising a pressure-sensitive adhesive composition which comprises a crosslinkable acrylic copolymer (A) containing a monomer having a crosslinking functional group and a non-crosslinkable acrylic copolymer (B) at a mixture ratio of 1:9 to 3:17,
wherein the acrylic copolymer (A) consists of 75 to 97 parts by weight of a (meth)acrylic acid ester monomer with respect to 100 parts by weight of the acrylic copolymer (A), 3 to 25 parts by weight of an aromatic group containing monomer with respect to 100 parts by weight of the acrylic copolymer (A), 0.1 to 10 parts by weight of the monomer having the crosslinking functional group with respect to 100 parts by weight of the acrylic copolymer (A), and a first polymerization initiator,
wherein the acrylic copolymer (B) consists of 75 to 97 parts by weight of a (meth)acrylic acid ester monomer with respect to 100 parts by weight of the acrylic copolymer (B), and 3 to 25 parts by weight of an aromatic group containing monomer with respect to 100 parts by weight of the acrylic copolymer (B) and a second polymerization initiator, and
wherein the aromatic group containing monomer is benzyl (meth)acrylate or a compound represented by the following Formula 1:

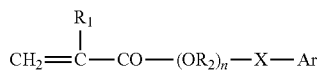

[Formula 1]

where $R_1$ indicates hydrogen or a methyl group,
$R_2$ indicates an alkylene group having 1 to 12 carbon atoms,
n indicates an integer of 0 to 3,
X indicates a single bond, oxygen, sulfur, or an alkylene group of 1 to 4 carbon atoms, and
Ar indicates an aromatic group unsubstituted or substituted with halogen or alkyl of 1 to 12 carbon atoms,
wherein weight average molecular weights of the acrylic copolymers (A) and (B) are more than 1,000,000, respectively.

2. The polarizer of claim 1, wherein the (meth)acrylic acid ester monomer is one or more selected from a group consisting of methyl (meth)acrylate, ethyl (meth)acrylate, n-propyl (meth)acrylate, isopropyl (meth)acrylate, t-butyl (meth)acrylate, n-butyl (meth)acrylate, sec-butyl (meth)acrylate, pentyl (meth)acrylate, 2-ethylhexyl (meth)acrylate, n-octyl (meth)acrylate, isooctyl (meth)acrylate, isononyl (meth)acrylate, and lauryl (meth)acrylate.

3. The polarizer of claim 1, wherein the compound represented by the Formula 1 is one or more selected from a group consisting of phenoxy ethyl (meth)acrylate, 2-phenylthio-1-ethyl acrylate, 8-(2-naphtyloxy)-1-octyl acrylate, and 2-(1-naphtyloxy)-1-ethyl acrylate.

4. The polarizer of claim 1, wherein the monomer having a crosslinking functional group is one or more selected from a group consisting of a hydroxy group containing monomer, a carboxyl group containing monomer, and anhydride thereof.

5. The polarizer of claim 1, wherein the monomer having a crosslinking functional group is one or more selected from a group consisting of 2-hydroxyethyl (meth)acrylate, 3-hydroxypropyl (meth)acrylate, 4-hydroxybutyl (meth)acrylate, 2-hydroxyethyleneglycol (meth)acrylate, 3-hydroxypropyleneglycol (meth)acrylate, acrylic acid, methacrylic acid, an acrylic acid dimer, itaconic acid, maleic acid, and maleic acid anhydride.

6. The polarizer of claim 1, wherein the pressure sensitive adhesive composition further comprising 0.01 to 10 parts by weight of a multifunctional crosslinking agent based on 100 parts by weight of the acrylic copolymers (A) and (B).

7. The polarizer of claim 6, wherein the multifunctional crosslinking agent is one or more selected from a group consisting of an isocyanate compound, an epoxy compound, an aziridine compound, and a metal chelate compound.

8. The polarizer of claim 1, wherein the pressure sensitive adhesive composition further comprising 0.005 to 5 parts by weight of a silane coupling agent based on 100 parts by weight of the acrylic copolymers (A) and (B).

9. The polarizer of claim 1, wherein the pressure sensitive adhesive composition further comprising 1 to 100 parts by weight of a tackifier resin based on 100 parts by weight of the acrylic copolymers (A) and (B).

10. The polarizer of claim 9, wherein the tackifier resin is one or more selected from a group consisting of (hydrogenated) hydrocarbon resin, (hydrogenated) rosin resin, (hydrogenated) rosin ester resin, (hydrogenated) terpene resin, (hydrogenated) terpene phenol resin, polymerized rosin resin, and polymerized rosin ester resin.

11. The polarizer of claim 1, wherein the pressure sensitive adhesive composition further comprising one or more selected from a group consisting of an acrylic low molecular weight substance, epoxy resin, a curing agent, a ultraviolet (UV) stabilizer, antioxidants, a coloring agent, a reinforcing agent, a filler, an antifoaming agent, a surfactant, and a plasticizer.

12. The polarizer of claim 1, wherein one or more protective film selected from a group consisting of a cellulose film, a polyester film, polyethersulfone film, and a polyolefin film is further formed on both sides of the polarization film.

13. The polarizer of claim 1, further comprising one or more functional layers selected from a group consisting of a protective layer, a reflective layer, an anti-glare film, a phase retardation film, a compensation film for wide view angle, and a brightness enhancing film.

14. A liquid crystal display (LCD) device comprising a liquid crystal panel in which the polarizer of claim 1 is attached onto one side or both sides of a liquid crystal cell.

* * * * *